(12) United States Patent
Kumar et al.

(10) Patent No.: US 10,924,334 B1
(45) Date of Patent: Feb. 16, 2021

(54) MONITORING DISTRIBUTED SYSTEMS WITH AUTO-REMEDIATION

(71) Applicant: salesforce.com, inc., San Francisco, CA (US)

(72) Inventors: Aishwarya Kumar, Fremont, CA (US); Raksha Subramanyam, Fremont, CA (US); Charles Kuo, Saratoga, CA (US); Tony Wong, San Francisco, CA (US); Wayne Rantala, Aurora (CA); Amey Ruikar, Mountain View, CA (US); Shailesh Govande, Sunnyvale, CA (US); Kevin Wang, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/569,268

(22) Filed: Sep. 12, 2019

(51) Int. Cl.
*H04L 12/00* (2006.01)
*H04L 12/24* (2006.01)
*H04L 29/08* (2006.01)
*G06F 16/25* (2019.01)

(52) U.S. Cl.
CPC .......... *H04L 41/069* (2013.01); *G06F 16/258* (2019.01); *H04L 67/10* (2013.01); *H04L 67/2842* (2013.01)

(58) Field of Classification Search
CPC .... G06F 11/3409; G06F 21/64; G06F 16/951; G06F 16/355; G06F 16/258; G06Q 40/08; G06Q 30/02; H04L 67/327; H04L 41/069; H04L 67/2842; H04L 67/10
USPC .................................................. 709/224, 223
See application file for complete search history.

(56) References Cited

U.S. PATENT DOCUMENTS

| 7,401,066 | B2 * | 7/2008 | Beinglass | H01L 22/20 257/E21.525 |
| 7,827,545 | B2 * | 11/2010 | Choe | G06F 21/57 717/168 |
| 8,132,260 | B1 * | 3/2012 | Mayer | H04L 67/125 726/25 |

(Continued)

*Primary Examiner* — Frantz Coby
(74) *Attorney, Agent, or Firm* — Jaffery Watson Mendonsa & Hamilton LLP

(57) ABSTRACT

System and methods are described for a monitoring system to monitor operations of a distributed computing system and provide feedback to subscribers. The monitoring system includes a data collection engine to receive data items comprising events, metrics, or one or more configurations about a distributed computing system being monitored, and to store selected data items into a message queue. The monitoring system also includes a data processing engine to receive the selected data items from the queue, transform the selected data items into transformed data items based at least in part on one or more settings for a subscriber and the one or more configurations of the distributed computing system, and store the transformed data items into one or more of a database and a cache. The monitoring system also includes a feedback engine to read the transformed data items from the one or more of the database and the cache, generate feedback for the subscriber based at least in part on the transformed data items and the one or more settings for the subscriber and the configurations, and send the feedback to the subscriber.

17 Claims, 17 Drawing Sheets

(56) References Cited

U.S. PATENT DOCUMENTS

| | | | |
|---|---|---|---|
| 8,984,643 B1* | 3/2015 | Krisher | H04L 63/1433 |
| | | | 726/25 |
| 9,154,523 B2* | 10/2015 | Bezilla | H04L 43/0876 |
| 9,245,014 B2* | 1/2016 | Kozak | G06F 16/355 |
| 2004/0075681 A1* | 4/2004 | Anati | G06Q 30/06 |
| | | | 715/738 |
| 2005/0004905 A1* | 1/2005 | Dresden | G06F 16/951 |
| 2005/0005159 A1* | 1/2005 | Oliphant | H04L 63/1441 |
| | | | 726/26 |
| 2005/0015622 A1* | 1/2005 | Williams | H04L 63/1433 |
| | | | 726/4 |
| 2008/0243558 A1* | 10/2008 | Gupte | G06Q 40/08 |
| | | | 705/4 |
| 2012/0316896 A1* | 12/2012 | Rahman | G06F 19/3418 |
| | | | 705/3 |
| 2013/0191304 A1* | 7/2013 | Gaucas | G06Q 30/02 |
| | | | 705/347 |
| 2013/0347107 A1* | 12/2013 | Williams | H04L 63/0218 |
| | | | 726/22 |
| 2014/0331326 A1* | 11/2014 | Thakur | H04L 63/1433 |
| | | | 726/25 |
| 2015/0149609 A1* | 5/2015 | Zou | H04L 43/08 |
| | | | 709/224 |
| 2016/0323243 A1* | 11/2016 | LeVasseur | G06F 21/64 |
| 2018/0144465 A1* | 5/2018 | Hsieh | G06N 3/08 |
| 2018/0359498 A1* | 12/2018 | Wolf | H04N 21/266 |
| 2019/0007524 A1* | 1/2019 | Krishnamurthy | H04L 67/327 |
| 2019/0114247 A1* | 4/2019 | Chen | G06F 11/3409 |

\* cited by examiner

US 10,924,334 B1

MONITORING DISTRIBUTED SYSTEMS WITH AUTO-REMEDIATION

TECHNICAL FIELD

One or more implementations relate to distributed computing, and more specifically to monitoring processing of a distributed system in a cloud computing environment.

BACKGROUND

"Cloud computing" services provide shared resources, software, and information to computers and other devices upon request or on demand. Cloud computing typically involves the over-the-Internet provision of dynamically scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

System administrators may desire to monitor the status of distributed systems in a cloud computing environment. Some current monitoring solutions require a system administrator to review emails and analyze user interface (UI) dashboards to determine information about the status of the distributed systems. However, such current monitoring solutions are cumbersome, reactive, and incomplete.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Embodiments of the present invention provide for real-time monitoring of a distributed computing system. The auto-remediating monitoring system of embodiments of the present invention comprises multiple data processing pipelines including a data collection engine, and a contextual processing engine comprising a data processing engine and a feedback engine. The data collection engine obtains information about the current status and operation of the distributed computing system, including but not limited to, metrics, events, and configurations, and stores this data for further processing. The data collection pipeline is scalable, robust and available to support ingestion of extremely large amounts of data from multiple application layers. The data processing engine transforms the collected data into organized and filtered data units. The feedback engine converts the organized and filtered data units into appropriate responses to subscribed applications (called subscribers herein) resulting in optimizations, and automatic remediations for the distributed computing system to remain stable, performant, available and efficient. Thus, a feedback loop between the feedback engine and subscribed applications is established to improve and/or maintain a desired level of distributed computing system performance in a cloud computing environment.

Figure 1A:
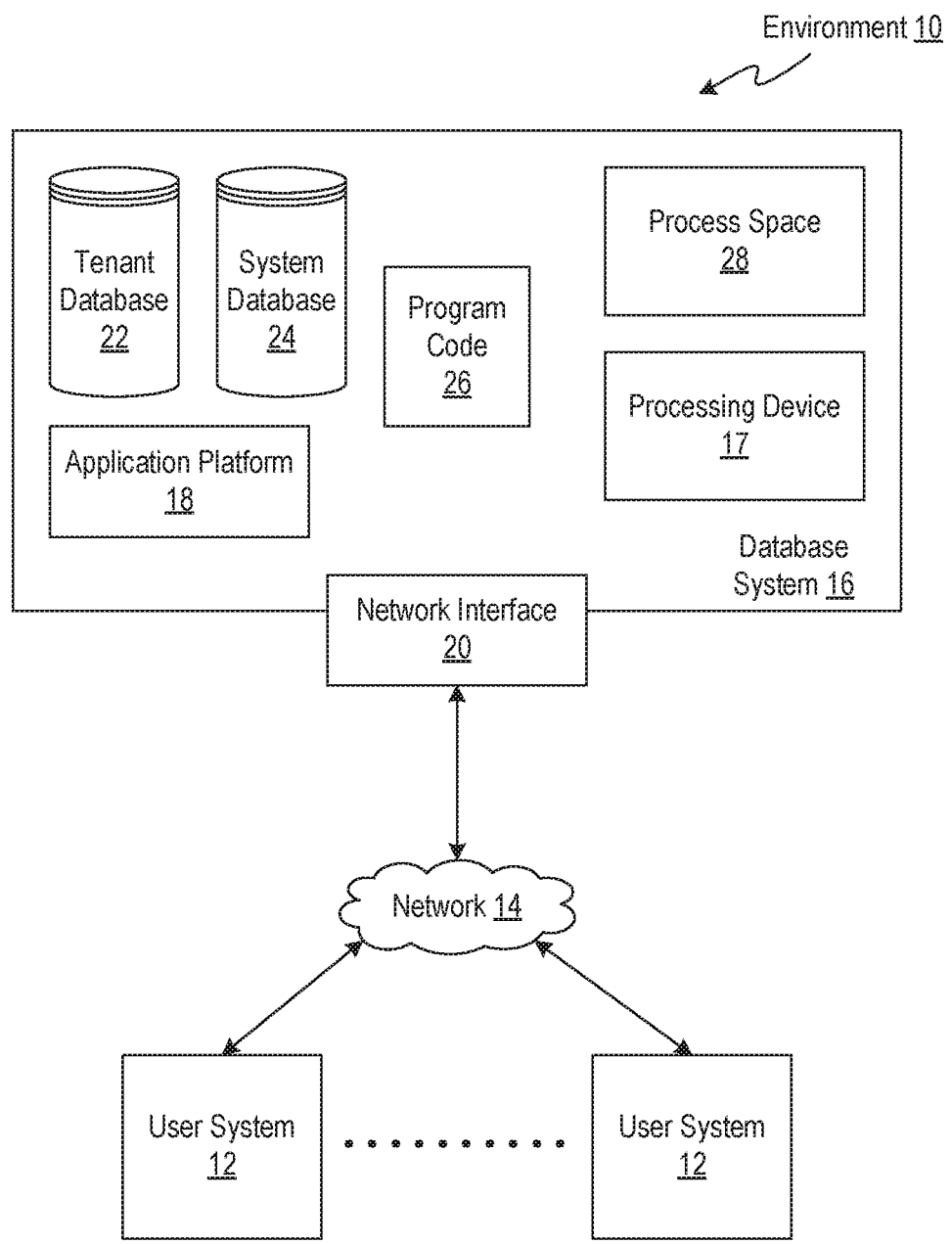
FIG. 1A illustrates an example computing environment of an on-demand database service according to some embodiments.

FIG. 1A illustrates a block diagram of an example of a cloud computing environment 10 in which an on-demand database service can be used in accordance with some implementations. Environment 10 includes user systems 12 (e.g., customer's computing systems), a network 14, a database system 16 (also referred to herein as a "cloud-based system" or a "cloud computing system"), a processing device 17, an application platform 18, a network interface 20, a tenant database 22 for storing tenant data, a system database 24 for storing system data, program code 26 for implementing various functions of the database system 16 (including applications), and process space 28 for executing database system processes and tenant-specific processes, such as running applications for customers as part of an application hosting service. In some other implementations, environment 10 may not have all these components or systems, or may have other components or systems instead of, or in addition to, those listed above. In some embodiments, tenant database 22 is a shared storage.

In some implementations, environment 10 is a computing environment in which an on-demand database service exists. An on-demand database service, such as that which can be implemented using database system 16, is a service that is made available to users outside an enterprise (or enterprises) that owns, maintains, or provides access to database system 16. As described above, such users generally do not need to be concerned with building or maintaining database system 16. Instead, resources provided by database system 16 may be available for such users' use when the users need services provided by database system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a large number of customers, and a given database table may store rows of data for a potentially much larger number of customers. A database image can include one or more database objects. A relational database management system (RDBMS) or the equivalent can execute storage and retrieval of information against the database object(s).

Application platform 18 can be a framework that allows the applications of database system 16 to execute, such as the hardware or software infrastructure of database system 16. In some implementations, application platform 18 enables the creation, management and execution of one or more applications developed by the provider of the on-demand database service, users accessing the on-demand database service via user systems 12, or third-party application developers accessing the on-demand database service via user systems 12.

In some implementations, database system 16 implements a web-based customer relationship management (CRM) system. For example, in some such implementations, database system 16 includes application servers configured to implement and execute CRM software applications as well as provide related data, code, forms, renderable web pages, and documents and other information to and from user systems 12 and to store to, and retrieve from, a database system related data, objects, and World Wide Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. Database system 16 also implements applications other than, or in addition to, a CRM application. For example, database system 16 can provide tenant access to multiple hosted (standard and custom) applications, including a CRM application. User (or third-party developer) applications, which may or may not include CRM, may be supported by application platform 18. Application platform 18 manages the creation and storage of the applications into one or more database objects and the execution of the applications in one or more virtual machines in the process space of database system 16.

According to some implementations, each database system 16 is configured to provide web pages, forms, applications, data, and media content to user (client) systems 12 to support the access by user systems 12 as tenants of database system 16. As such, database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application, such as an object-oriented database management system (OODBMS) or a relational database management system (RDBMS), as is well known in the art. It should also be understood that "server system", "server", "server node", and "node" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

Network 14 can be or include any network or combination of networks of systems or devices that communicate with one another. For example, network 14 can be or include any one or any combination of a local area network (LAN), wide area network (WAN), telephone network, wireless network, cellular network, point-to-point network, star network, token ring network, hub network, or other appropriate configuration. Network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

User systems 12 (e.g., operated by customers) can communicate with database system 16 using TCP/IP and, at a higher network level, other common Internet protocols to communicate, such as the Hyper Text Transfer Protocol (HTTP), Hyper Text Transfer Protocol Secure (HTTPS), File Transfer Protocol (FTP), Apple File Service (AFS), Wireless Application Protocol (WAP), etc. In an example where HTTP is used, each user system 12 can include an HTTP client commonly referred to as a "web browser" or simply a "browser" for sending and receiving HTTP signals to and from an HTTP server of the database system 16. Such an HTTP server can be implemented as the sole network interface 20 between database system 16 and network 14, but other techniques can be used in addition to or instead of these techniques. In some implementations, network interface 20 between database system 16 and network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

User systems 12 can be implemented as any computing device(s) or other data processing apparatus or systems usable by users to access database system 16. For example, any of user systems 12 can be a desktop computer, a workstation, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, Google's Chrome browser, or a WAP-enabled browser in the case of a cellular phone, personal digital assistant (PDA), or other wireless device, allowing a user (for example, a subscriber of on-demand services provided by database system 16) of user system 12 to access, process, and view information, pages, and applications available to it from database system 16 over network 14.

Each user system 12 also typically includes one or more user input devices, such as a keyboard, a mouse, a trackball, a touch pad, a touch screen, a pen or stylus, or the like, for interacting with a graphical user interface (GUI) provided by the browser on a display (for example, a monitor screen, liquid crystal display (LCD), light-emitting diode (LED) display, etc.) of user system 12 in conjunction with pages, forms, applications, and other information provided by database system 16 or other systems or servers. For example, the user interface device can be used to access data and applications hosted database system 16, and to perform searches on stored data, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with database system 16, that user system can have the capacities allotted to the salesperson. However, while an administrator is using that user system 12 to interact with database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as a Core® processor commercially available from Intel Corporation or the like. Similarly, database system 16 (and additional instances of an MTS, where more than one is present) and all of its components can be operator-configurable using application(s) including computer code to run using processing device 17, which may be implemented to include a CPU, which may include an Intel Core® processor or the like, or multiple CPUs. Each CPU may have multiple processing cores.

Database system 16 includes non-transitory computer-readable storage media having instructions stored thereon that are executable by or used to program a server or other computing system (or collection of such servers or computing systems) to perform some of the implementation of processes described herein. For example, program code 26 can include instructions for operating and configuring database system 16 to intercommunicate and to process web pages, applications, and other data and media content as described herein. In some implementations, program code 26 can be downloadable and stored on a hard disk, but the entire program code, or portions thereof, also can be stored in any other volatile or non-volatile memory medium or device as is well known, such as a read-only memory (ROM) or random-access memory (RAM), or provided on any media capable of storing program code, such as any type of rotating media including floppy disks, optical discs, digital video discs (DVDs), compact discs (CDs), microdrives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, virtual private network (VPN), local area network (LAN), etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VB Script, and many other programming languages as are well known.

Figure 1B:
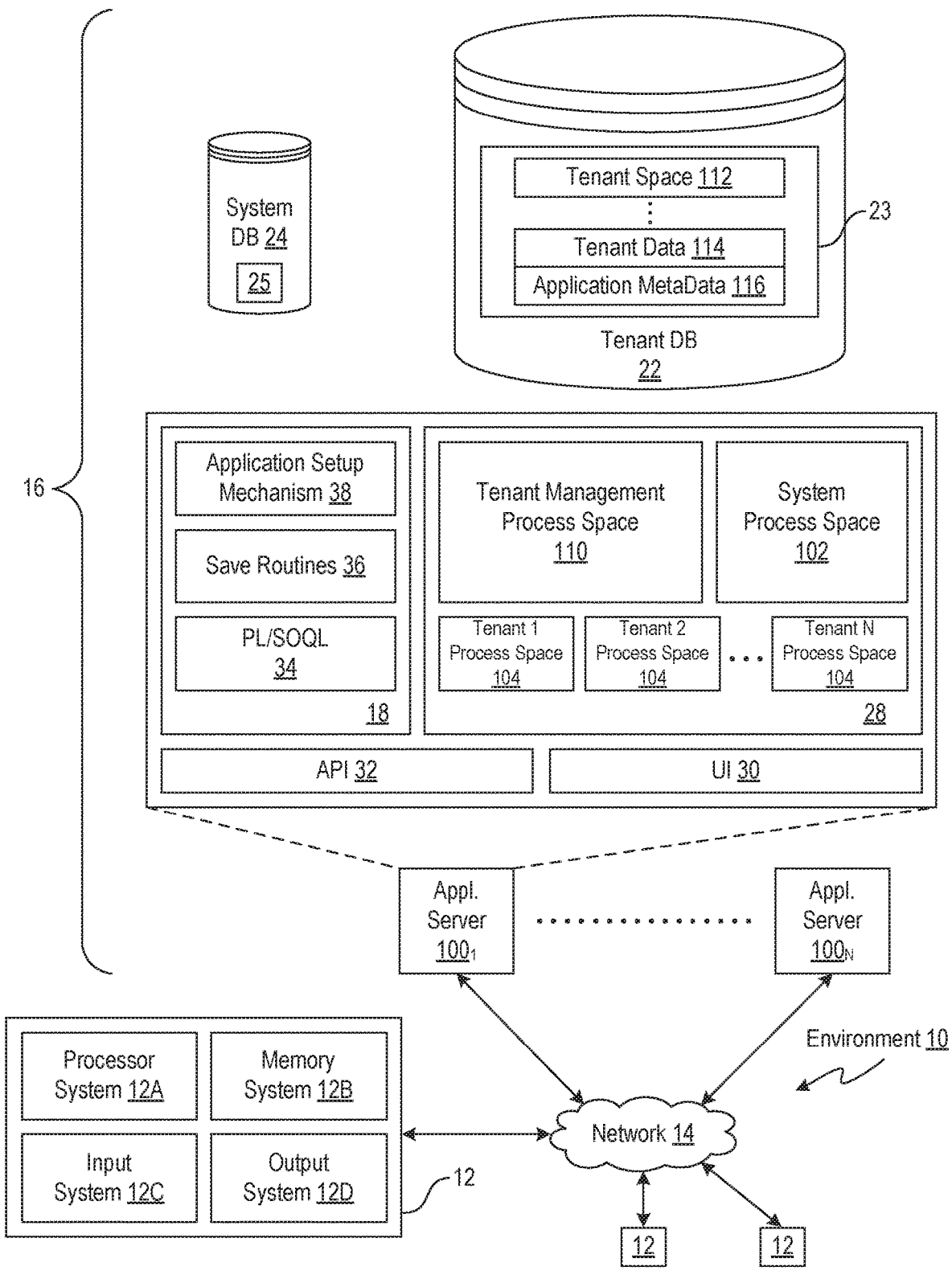
FIG. 1B illustrates example implementations of elements of FIG. 1A and example interconnections between these elements according to some embodiments.

FIG. 1B illustrates a block diagram of example implementations of elements of FIG. 1A and example interconnections between these elements according to some implementations. That is, FIG. 1B also illustrates environment 10, but in FIG. 1B, various elements of database system 16 and various interconnections between such elements are shown with more specificity according to some more specific implementations. In some implementations, database system 16 may not have the same elements as those described herein or may have other elements instead of, or in addition to, those described herein.

In FIG. 1B, user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, network interface 20 is implemented as a set of HTTP application servers $100_1$-$100_N$. Each application server 100, also referred to herein as an "app server," is configured to communicate with tenant database 22 and tenant data 23 stored therein, as well as system database 24 and system data 25 stored therein, to serve requests received from user systems 12. Tenant data 23 can be divided into individual tenant storage spaces 112, which can be physically or logically arranged or divided. Within each tenant storage space 112, tenant data 114 and application metadata 116 can similarly be allocated for each user. For example, a copy of a user's most recently used (MRU) items can be stored in tenant data 114. Similarly, a copy of MRU items for an entire organization that is a tenant can be stored to tenant space 112.

Database system 16 of FIG. 1B also includes a user interface (UI) 30 and an application programming interface (API) 32. Process space 28 includes system process space 102, individual tenant process spaces 104 and a tenant management process space 110. Application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process space 110, for example. Invocations to such applications can be coded using procedural language for structured query language (PL/SQL) 34, which provides a programming language style interface extension to the API 32. A detailed description of some PL/SQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, issued on Jun. 1, 2010, and hereby incorporated by reference herein in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_2$ can be coupled via a direct network link, and another application server $100_N$ can be coupled by yet a different network connection. Transfer Control Protocol and Internet Protocol (TCP/IP) are examples of typical protocols that can be used for communicating between application servers 100 and database system 16. However, it will be apparent to one skilled in the art that other transport protocols can be used to optimize database system 16 depending on the network interconnections used.

In some implementations, each application server 100 is configured to handle requests for any user associated with any organization that is a tenant of database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between application servers 100 and user systems 12 to distribute requests to application servers 100. In one implementation, the load balancer uses a least-connections algorithm to route user requests to application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, database system 16 can be a multi-tenant system in which database system 16 handles storage of, and access to, different objects, data, and applications across disparate users and organizations.

In one example storage use case, one tenant can be a company that employs a sales force where each salesperson uses database system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed database system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, database system 16 also can maintain system level data usable by multiple tenants or other data. Such system level data can include industry reports, news, postings, and the like that are sharable among tenants.

In some implementations, user systems 12 (which also can be client systems) communicate with application servers 100 to request and update system-level and tenant-level data from database system 16. Such requests and updates can involve sending one or more queries to tenant database 22 or system database 24. Database system 16 (for example, an application server 100 in database system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, issued on Aug. 17, 2010, and hereby incorporated by reference herein in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
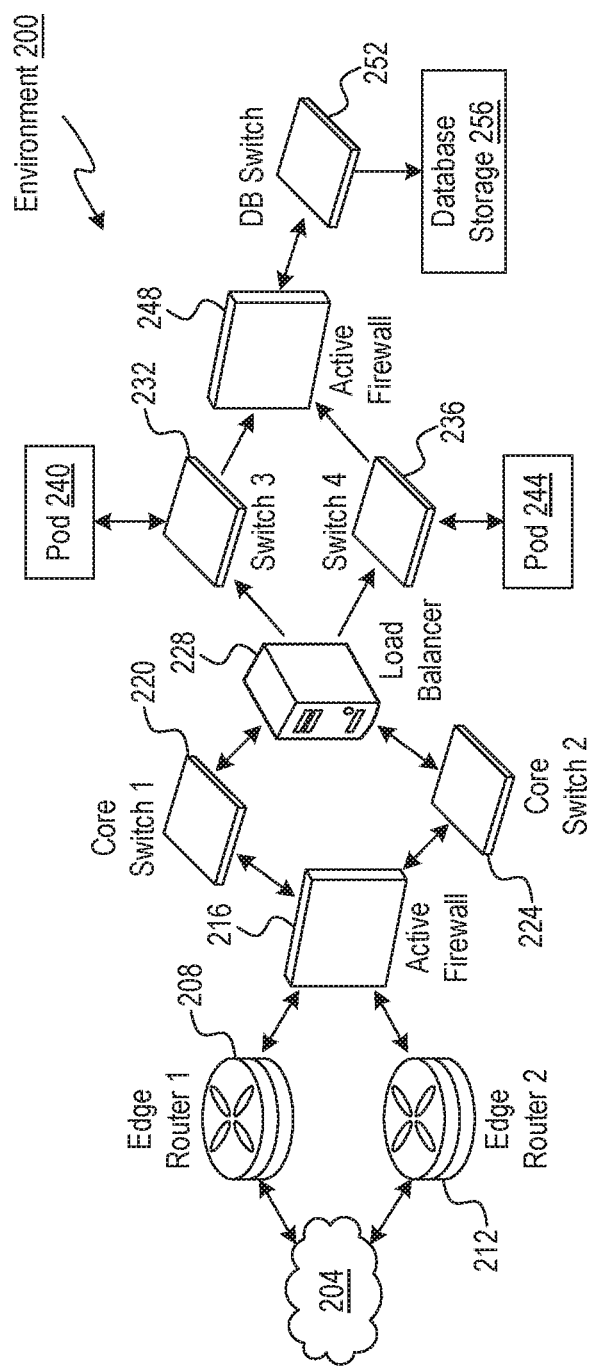
FIG. 2A illustrates example architectural components of an on-demand database service environment according to some embodiments.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. Pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
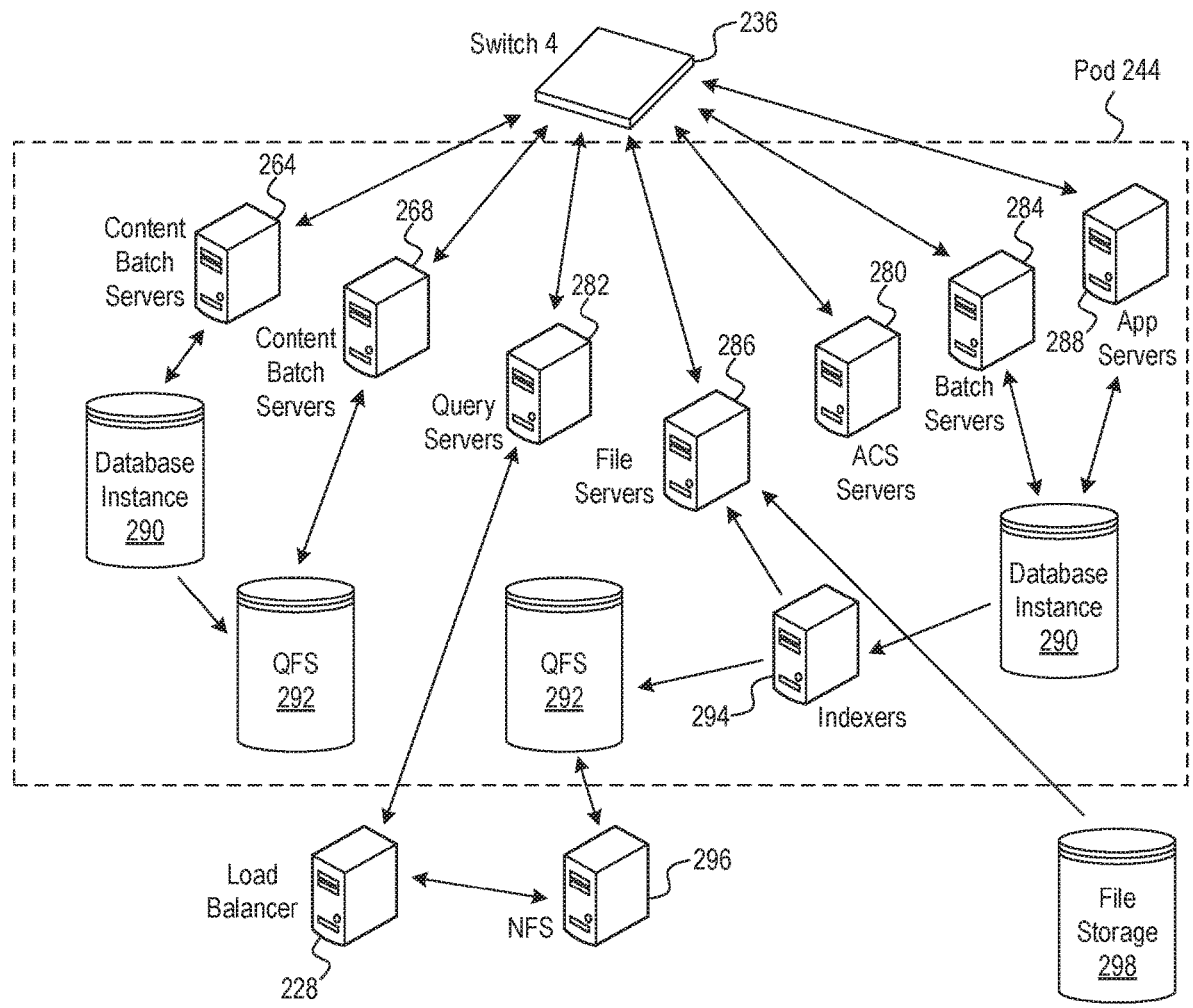
FIG. 2B illustrates example architectural components of an on-demand database service environment according to some embodiments.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to many devices of each type. Also, the on-demand database service environment need not include each device shown in FIGS. 2A and 2B or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server," "device," and "processing device" as used herein are not limited to a single hardware device; rather, references to these terms can include any suitable combination of hardware and software configured to provide the described functionality.

Cloud 204 is intended to refer to a data network or multiple data networks, often including the Internet. Client machines communicably connected with cloud 204 can communicate with other components of the on-demand database service environment 200 to access services provided by the on-demand database service environment. For example, client machines can access the on-demand database service environment to retrieve, store, edit, or process information. In some implementations, edge routers 208 and 212 route packets between cloud 204 and other components of the on-demand database service environment 200. For example, edge routers 208 and 212 can employ the Border Gateway Protocol (BGP). The BGP is the core routing protocol of the Internet. Edge routers 208 and 212 can maintain a table of Internet Protocol (IP) networks or 'prefixes,' which designate network reachability among autonomous systems on the Internet.

In some implementations, firewall 216 can protect the inner components of the on-demand database service environment 200 from Internet traffic. Firewall 216 can block, permit, or deny access to the inner components of on-demand database service environment 200 based upon a set of rules and other criteria. Firewall 216 can act as one or more of a packet filter, an application gateway, a stateful filter, a proxy server, or any other type of firewall.

In some implementations, core switches 220 and 224 are high-capacity switches that transfer packets within the on-demand database service environment 200. Core switches 220 and 224 can be configured as network bridges that quickly route data between different components within the on-demand database service environment. In some implementations, the use of two or more core switches 220 and 224 can provide redundancy or reduced latency.

In some implementations, pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between pods 240 and 244 is conducted via pod switches 232 and 236. Pod switches 232 and 236 can facilitate communication between pods 240 and 244 and client machines communicably connected with cloud 204, for example, via core switches 220 and 224. Also, pod switches 232 and 236 may facilitate communication between pods 240 and 244 and database storage 256. In some implementations, load balancer 228 can distribute workload between pods 240 and 244. Balancing the on-demand service requests between the pods can assist in improving the use of resources, increasing throughput, reducing response times, or reducing overhead. Load balancer 228 may include multilayer switches to analyze and forward traffic.

In some implementations, access to database storage 256 is guarded by a database firewall 248. Database firewall 248 can act as a computer application firewall operating at the database application layer of a protocol stack. Database firewall 248 can protect database storage 256 from application attacks such as SQL injection, database rootkits, and unauthorized information disclosure. In some implementations, database firewall 248 includes a host using one or more forms of reverse proxy services to proxy traffic before passing it to a gateway router. Database firewall 248 can inspect the contents of database traffic and block certain content or database requests. Database firewall 248 can work on the SQL application level atop the TCP/IP stack, managing applications' connection to the database or SQL management interfaces as well as intercepting and enforcing packets traveling to or from a database network or application interface.

In some implementations, communication with database storage 256 is conducted via database switch 252. Multi-tenant database storage 256 can include more than one hardware or software components for handling database queries. Accordingly, database switch 252 can direct database queries transmitted by other components of the on-demand database service environment (for example, pods 240 and 244) to the correct components within database storage 256. In some implementations, database storage 256 is an on-demand database system shared by many different organizations as described above with reference to FIGS. 1A and 1B.

FIG. 2B shows a system diagram further illustrating example architectural components of an on-demand database service environment according to some implementations. Pod 244 can be used to render services to a user of on-demand database service environment 200. In some implementations, each pod includes a variety of servers or other systems. Pod 244 includes one or more content batch servers 264, content search servers 268, query servers 282, file servers 286, access control system (ACS) servers 280, batch servers 284, and app servers 288. Pod 244 also can include database instances 290, quick file systems (QFS) 292, and indexers 294. In some implementations, some or all communication between the servers in pod 244 can be transmitted via pod switch 236.

In some implementations, app servers 288 include a hardware or software framework dedicated to the execution of procedures (for example, programs, routines, scripts) for supporting the construction of applications provided by on-demand database service environment 200 via pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

Content batch servers 264 can handle requests internal to the pod. Some such requests can be long-running or not tied to a particular customer. For example, content batch servers 264 can handle requests related to log mining, cleanup work, and maintenance tasks. Content search servers 268 can provide query and indexer functions. For example, the functions provided by content search servers 268 can allow users to search through content stored in the on-demand database service environment. File servers 286 can manage requests for information stored in file storage 298. File storage 298 can store information such as documents, images, and binary large objects (BLOBs). In some embodiments, file storage 298 is a shared storage. By managing requests for information using file servers 286, the image footprint on the database can be reduced. Query servers 282 can be used to retrieve information from one or more file systems. For example, query servers 282 can receive requests for information from app servers 288 and transmit information queries to network file systems (NFS) 296 located outside the pod.

Pod 244 can share a database instance 290 configured as a multi-tenant environment in which different organizations share access to the same database. Additionally, services rendered by pod 244 may call upon various hardware or software resources. In some implementations, ACS servers 280 control access to data, hardware resources, or software resources. In some implementations, batch servers 284 process batch jobs, which are used to run tasks at specified times. For example, batch servers 284 can transmit instructions to other servers, such as app servers 288, to trigger the batch jobs.

In some implementations, QFS 292 is an open source file system available from Sun Microsystems, Inc. The QFS can serve as a rapid-access file system for storing and accessing information available within the pod 244. QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in NFS 296 or other storage systems.

In some implementations, one or more query servers 282 communicate with the NFS 296 to retrieve or update information stored outside of the pod 244. NFS 296 can allow servers located in pod 244 to access information to access files over a network in a manner similar to how local storage is accessed. In some implementations, queries from query servers 282 are transmitted to NFS 296 via load balancer 228, which can distribute resource requests over various resources available in the on-demand database service environment. NFS 296 also can communicate with QFS 292 to update the information stored on NFS 296 or to provide information to QFS 292 for use by servers located within pod 244.

In some implementations, the pod includes one or more database instances 290. Database instance 290 can transmit information to QFS 292. When information is transmitted to the QFS, it can be available for use by servers within pod 244 without using an additional database call. In some implementations, database information is transmitted to indexer 294. Indexer 294 can provide an index of information available in database instance 290 or QFS 292. The index information can be provided to file servers 286 or QFS 292.

Figure 3:
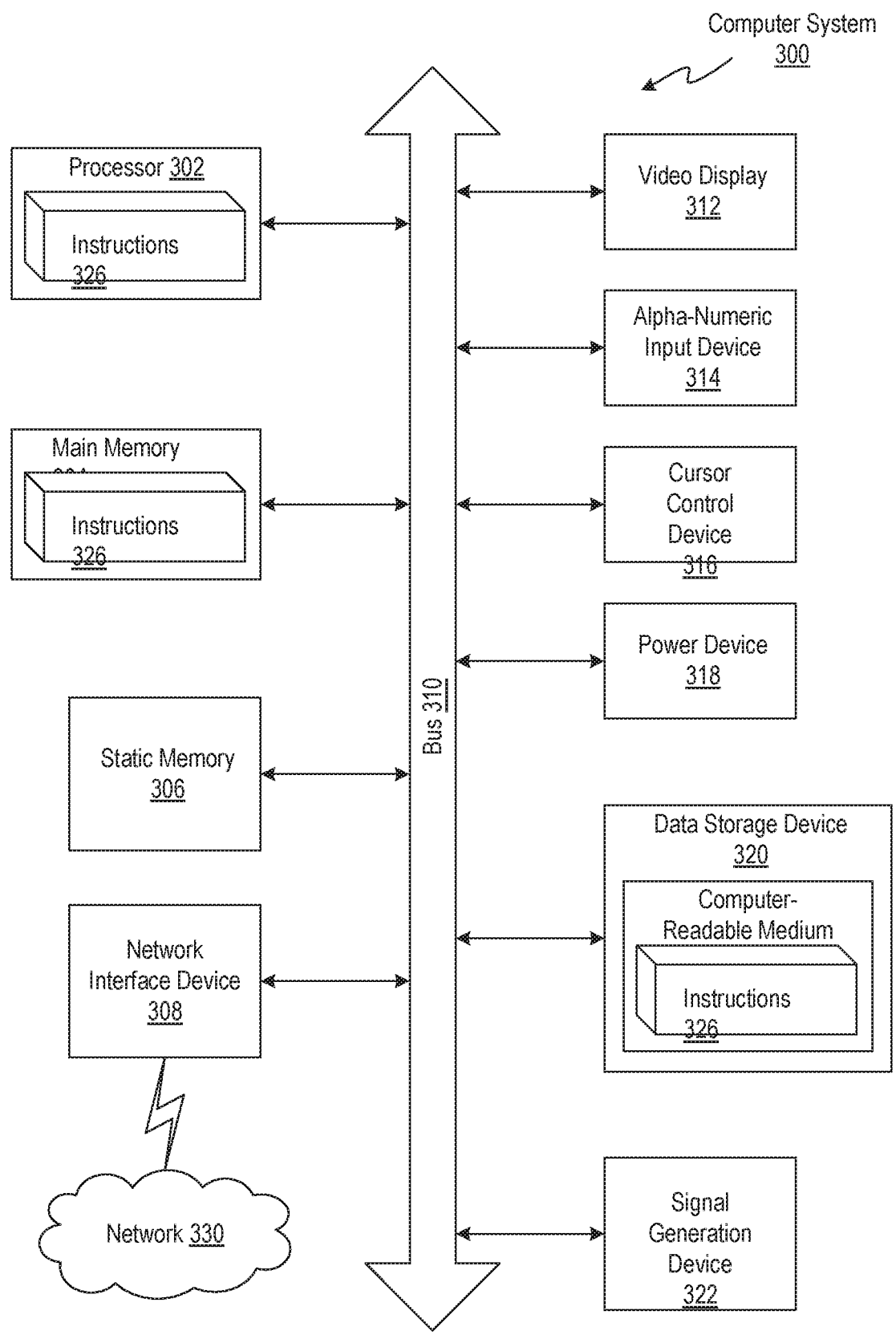
FIG. 3 is a diagrammatic representation of a machine in the exemplary form of a computer system within which one or more embodiments may be carried out.

FIG. 3 illustrates a diagrammatic representation of a machine in the exemplary form of a computer system 300 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 300 may be utilized by or illustrative of any of the electronic components described herein (e.g., any of the components illustrated in or described with respect to FIGS. 1A, 1B, 2A, and 2B).

The exemplary computer system 300 includes a processing device (processor) 302, a main memory 304 (e.g., ROM, flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 320, which communicate with each other via a bus 310.

Processor 302 represents one or more general-purpose processing devices such as a microprocessor, central processing unit, or the like. More particularly, processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 302 may also be one or more special-purpose processing devices such as an application specific integrated circuit (ASIC), a field programmable gate array (FPGA), a digital signal processor (DSP), network processor, or the like. Processor 302 is configured to execute instructions 326 for performing the operations and steps discussed herein. Processor 302 may have one or more processing cores.

Computer system 300 may further include a network interface device 308. Computer system 300 also may include a video display unit 312 (e.g., a liquid crystal display (LCD), a cathode ray tube (CRT), or a touch screen), an alphanumeric input device 314 (e.g., a keyboard), a cursor control device 316 (e.g., a mouse or touch screen), and a signal generation device 322 (e.g., a loudspeaker).

Power device 318 may monitor a power level of a battery used to power computer system 300 or one or more of its components. Power device 318 may provide one or more interfaces to provide an indication of a power level, a time window remaining prior to shutdown of computer system 300 or one or more of its components, a power consumption rate, an indicator of whether computer system is utilizing an external power source or battery power, and other power related information. In some implementations, indications related to power device 318 may be accessible remotely (e.g., accessible to a remote back-up management module via a network connection). In some implementations, a battery utilized by power device 318 may be an uninterruptable power supply (UPS) local to or remote from computer system 300. In such implementations, power device 318 may provide information about a power level of the UPS.

Data storage device 320 may include a computer-readable storage medium 324 (e.g., a non-transitory computer-readable storage medium) on which is stored one or more sets of instructions 326 (e.g., software) embodying any one or more of the methodologies or functions described herein. Instructions 326 may also reside, completely or at least partially, within main memory 304 and/or within processor 302 during execution thereof by computer system 300, main memory 304, and processor 302 also constituting computer-readable storage media. Instructions 326 may further be transmitted or received over a network 330 (e.g., network 14) via network interface device 308.

In one implementation, instructions 326 include instructions for performing any of the implementations described herein. While computer-readable storage medium 324 is shown in an exemplary implementation to be a single medium, it is to be understood that computer-readable storage medium 324 may include a single medium or multiple media (e.g., a centralized or distributed database, and/or associated caches and servers) that store the one or more sets of instructions.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

Embodiments of the present invention provide a monitoring system for a distributed computing system that accepts heterogeneous data input values. Data input values include events and metrics from applications, databases, computing hardware, business processes, user actions, and local and global configuration information. The monitoring system collects the data input values from many sources within the distributed computing system, processes the data input values, and sends feedback information to subscribed applications (e.g., subscribers who have registered to receive feedback). The subscribers may then automatically perform remediation actions to change the behavior of the distributed computing system. Remediation actions may be different for each subscriber and for each received feedback.

Figure 4:
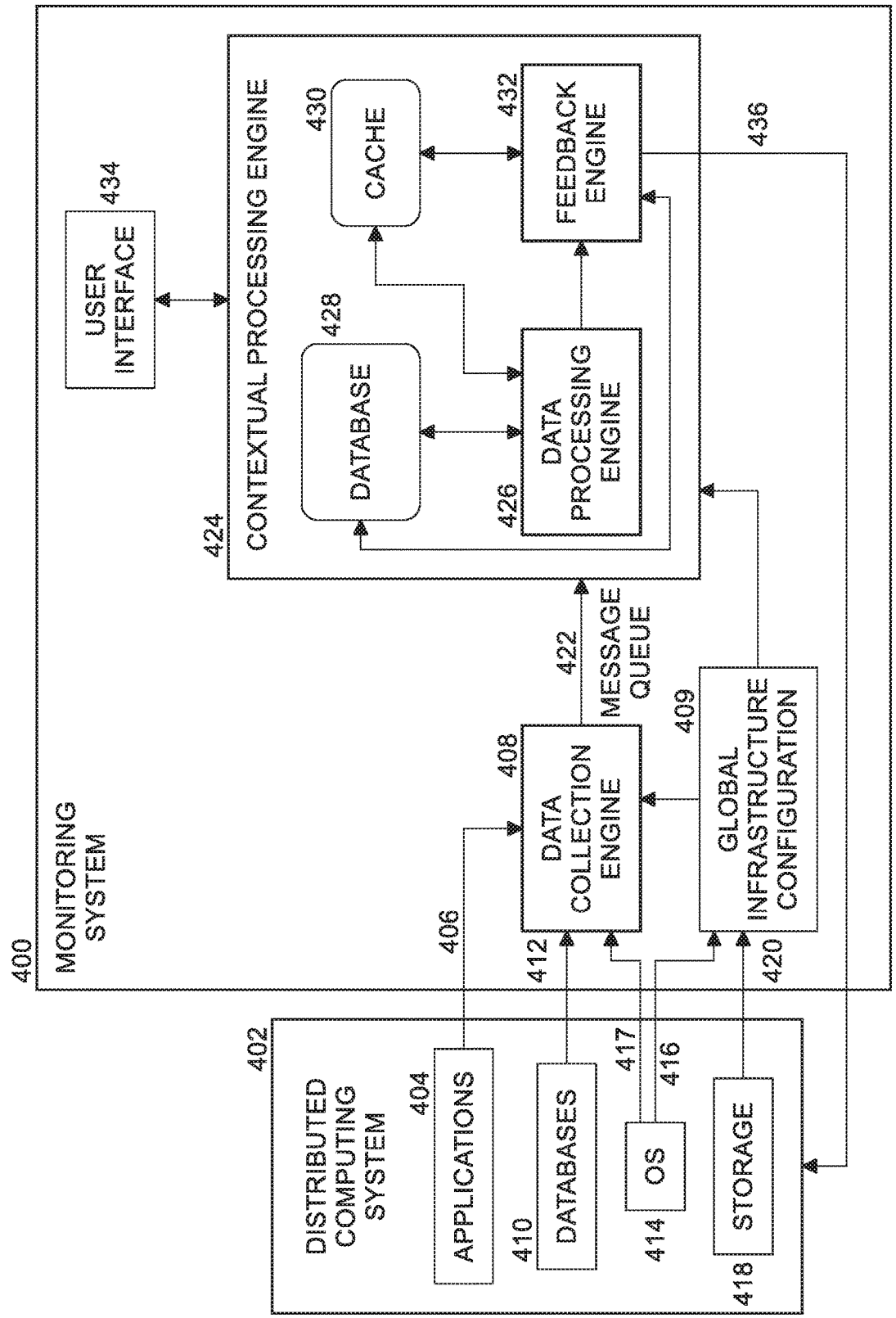
FIG. 4 illustrates an example of a monitoring system according to some embodiments.

FIG. 4 illustrates an example of a monitoring system 400 according to some embodiments. A distributed computing system 402 may be monitored by monitoring system 400. Distributed computing system 402 may be implemented by one or more servers in a cloud computing environment 200 as shown in FIG. 2. Distributed computing system 402 includes one or more applications 404, one or more databases 410, one or more operating systems (OSs), and storage 418. Distributed computing system 404 is representative of application server $100_1$ . . . application server $100_N$ of FIG. 1B, and any server shown in FIG. 2B. In an embodiment, monitoring system 400 is implemented within distributed computing system 402. In another embodiment, monitoring system 400 is implemented in any component of cloud computing environment 200 of FIG. 2A.

As used herein, an event is an observed change to the behavior of the state of the distributed computing system, the cloud computing environment in which the distributed computing system is implemented, or processes within the distributed computing system. A metric is a series of attribute values sampled over time regarding performance of any component or process of the distributed computing system. An engine as used herein is a process which processes events, metrics, and configuration items. The process may be implemented by a server. A subscriber is an application or process of the distributed computing system that is to receive feedback regarding the operational characteristics of the distributed computing system. In some scenarios, a subscriber automatically takes remedial action to change the behavior of the distributed computing system in response to receiving feedback.

Applications 404 are representative of application platform 18 of FIG. 1A. Applications 404 may be any type of application program being executed by a computing device within distributed computing system 402. While running, applications 404 send status information called events and/or metrics herein over communications interface 406 to data collection engine 408 in monitoring system 400. There may be any number of instances of applications running at a time in the distributed computing system (e.g., hundreds, thousands, tens of thousands, and so on), the number only being limited by the capabilities of the distributed computing system. Accordingly, the number of events and/or metrics being sent to data collection engine 408 from applications 404 may be any number (e.g., tens of thousands, hundreds of thousands, millions, and so on) over any given period of time. Hence, the ability of monitoring system 400 to receive and process extremely large amounts of data items (events and/or metrics) in an efficient manner is necessary to be able to provide useful and timely feedback to subscribers in distributed computing system 402.

Databases 410 may be any type of one or more database systems. Databases 410 are representative of tenant database 22 and/or system database 24 of FIGS. 1A and 1B, and database instances 290 of FIG. 2B. While running, databases 410 send status information such as events and/or metrics over communications interface 412 to data collection engine 408. There may be any number of instances of databases running at a time in the distributed computing system (e.g., hundreds, thousands, tens of thousands, and so on), the number only being limited by the capabilities of distributed computing system 402. Accordingly, the number of events and/or metrics being sent to data collector 408 from database 410 may be any number (e.g., tens of thousands, hundreds of thousands, millions, and so on) over any given period of time.

OS 414 may be any type of OS (e.g., Windows®, Linux™, iOS, and so on). OS 414 is representative of program code 26 of FIG. 1A, for example, which may run in system process space 102 of FIG. 1B. While running, any OS 414 may, at any time, update at least a portion of global infrastructure configuration information 409 over communications interface 416. Global infrastructure configuration includes any static or dynamic piece of information which defines the behavior and/or capabilities of distributed computing system 402. OS may also send metrics to data collection engine 408 over communications interface 417.

Storage 418 may be any type of one or more short term or long-term memory devices or storage devices. Storage 418 is representative of data storage device 320 of FIG. 3. Storage 418 may, at any time, update at least a portion of global infrastructure configuration information 409 over communications interface 420. In some embodiments, global infrastructure configuration 409 is stored in storage 418 within distributed computing system 402.

Data collection engine 408 receives events and metrics from applications 404 and databases 410, metrics from OS 414, and reads global infrastructure configuration 409. Data collection engine 408 inserts events, metrics, and selected global infrastructure configuration items into message queue 422. Data processing engine 426 of contextual processing engine 424 reads events, metrics, and selected global infrastructure configuration items from message queue 422, analyzes the events, metrics, and global infrastructure configuration items, transforms this data, and stores the transformed data into database 428 and/or cache 430. In an embodiment, message queue 422 is implemented as a messaging system such as Apache Kafka®, available from the Apache Software Foundation. Apache Kafka® may be used for building real-time data pipeline and streaming applications. In other embodiments, other implementations of message queues may be used. Feedback engine 432 of contextual processing engine 424 receives notification from data processing engine 426 when new transformed data is stored in database 428 and/or cache 430. Feedback processing engine 432 analyzes the transformed data to determine one or more appropriate feedback messages to send over communications interface 436 to subscribers in distributed computing system 402. Communications interface 436 may be any mechanism for reporting feedback, such as emails, text messages, automated telephone calls, function calls/callbacks, scripts, etc. In an embodiment, user interface 434 may also be used to display one or more feedback messages to a user of distributed computing system (such as a system administrator).

In some embodiments, data collection engine 408, contextual processing engine 424, and user interface are implemented as processes running on distributed computing system 402.

Figure 5:
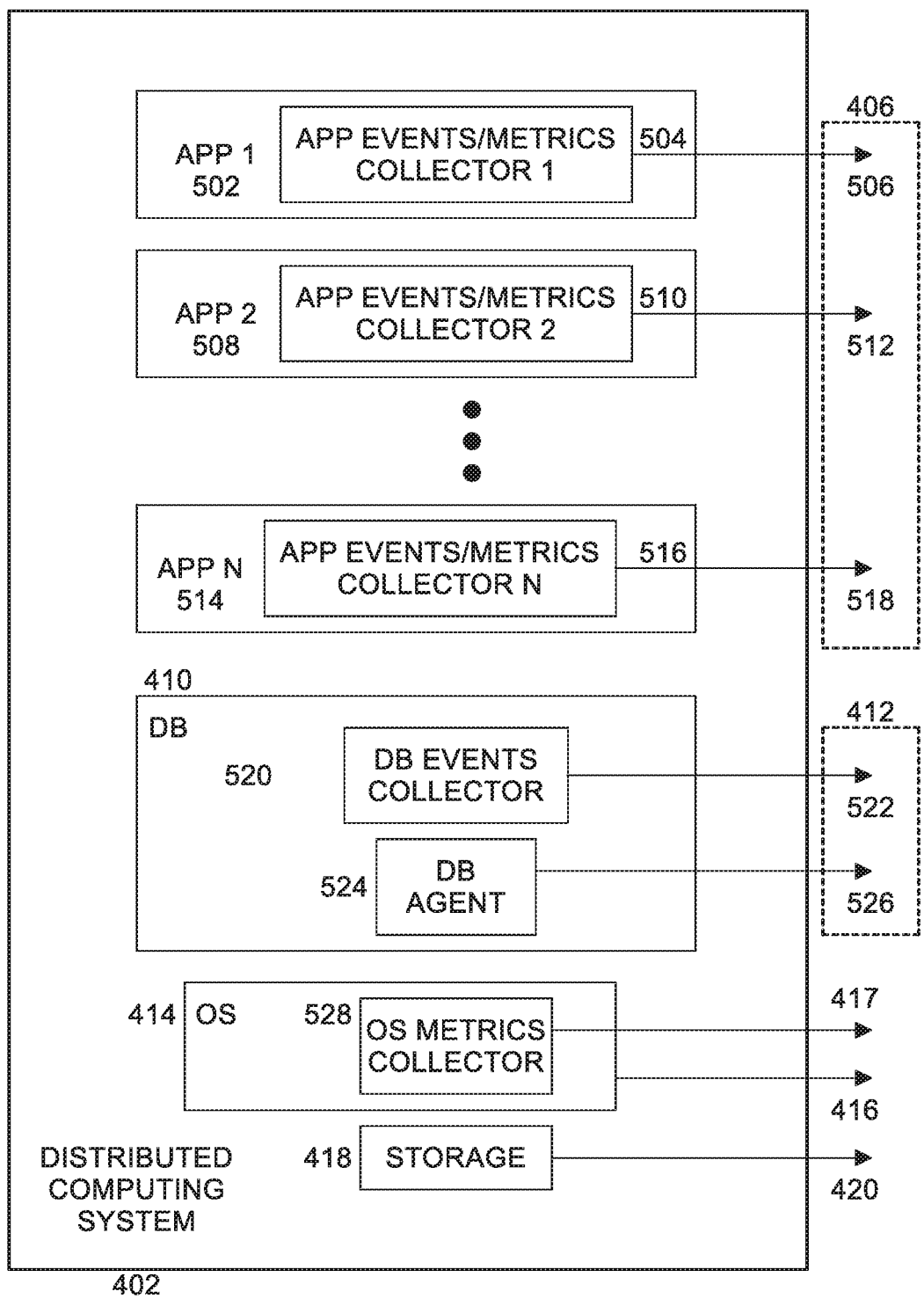
FIG. 5 illustrates an example of a distributed computing system according to some embodiments.

FIG. 5 illustrates an example of distributed computing system 402 according to some embodiments. Distributed computing system 402 includes a plurality of applications 404 such as app 1 502, app 2 508, app N 514, where N is a natural number. Each application to be included in feedback processing of monitoring system 400 includes one or more application (app) data collectors. An app data collector may be an app events collector or an app metrics collector. An application may include zero or more app events collectors and zero or more app metrics collectors, in any combination. An app events collector is configured to detect, collect and transmit data describing selected events occurring in an application. An app metrics collector is configured to collect and transmit metric data describing processing of an application. In some embodiments, app data collectors are code fragments embedded within or called by applications (e.g., plug-ins, applets, and the like). Thus, applications 502, 508, . . . 514 running on distributed computing system 402 send events and/or metrics to data collection engine 408. For example, app 1 502 may include app events/metrics collector 1 504, which sends events over communications interface 506 (part of 406). App 2 508 may include app events/metrics collector 2 510, which sends metrics over communications interface 512 (part of 406). App N 514 may include app events/metrics collector N 516, which sends events or metrics over communications interface 518 (part of 406). In practice, there may be large numbers of app data collectors running on distributed computing system 402 and sending events and metrics to data collection engine 408 (such as tens of thousands, hundreds of thousands, or even millions of app data collectors).

Databases (DB) 410 includes zero or more DB events collectors 520. Although only one DB is shown in FIG. 5, in some embodiments there may be any number of DBs in distributed computing system 402. DB events collector 520 is configured to detect, collect and transmit data describing selected events occurring in DB 404. DB events are transmitted over communications interface 522 (part of 412) to data collection engine 408. DB also includes zero or more DB agents 524 to coordinate transmission of DB events to data collection engine 408 over communications interface 526 (part of 412). OS 414 and Storage 418 operate as described above to update global infrastructure configuration 409 over communication interfaces 416, 420, respectively. OS 414 also includes zero or more OS metrics collectors 528, which send metrics over communications interface 417 to data collection engine 408.

Figure 6:
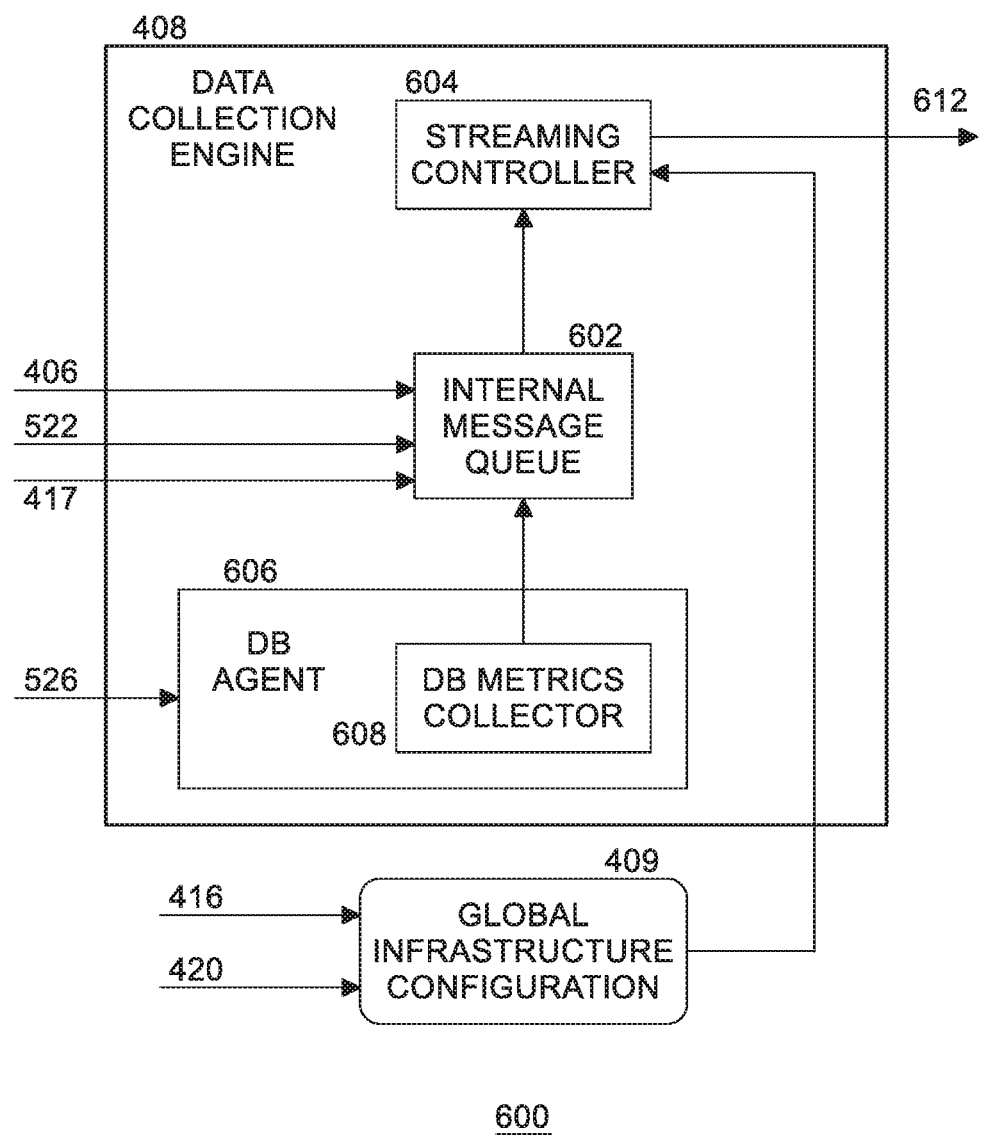
FIG. 6 illustrates an example of a data collection engine according to some embodiments.

FIG. 6 illustrates an example of data collection engine 408 according to some embodiments. As events and metrics are received from distributed computing system 402 over interfaces 406, 522, and 417, the events and metrics are stored into internal message queue 602. DB agent 606 in data collection engine 408 interfaces with corresponding DB agent 524 in DB 410 to coordinate the collection of DB metrics by DB metrics collector 608 over interface 526. DB metrics received from DB 410 are stored by DB metrics collector into internal message queue 602. In an embodiment, internal message queue 602 is implemented as an Apache Kafka® message system. Streaming controller 604 reads data input items such as events and metrics from internal message queue 602, and updated items from global infrastructure configuration 409, and sends this data over communications interface 612 into message queue 422. Streaming controller 604 receives streams of metrics from applications and/or databases and identifies data that subscribers are interested in and forwards only this filtered data to message queue 422. The filtered metric data comprises the selected metrics. Streaming controller also determines the computing environments that data is to be collected from (such as selected applications and/or databases, primary sources versus backup sources, depending on subscriber needs).

Figure 7:
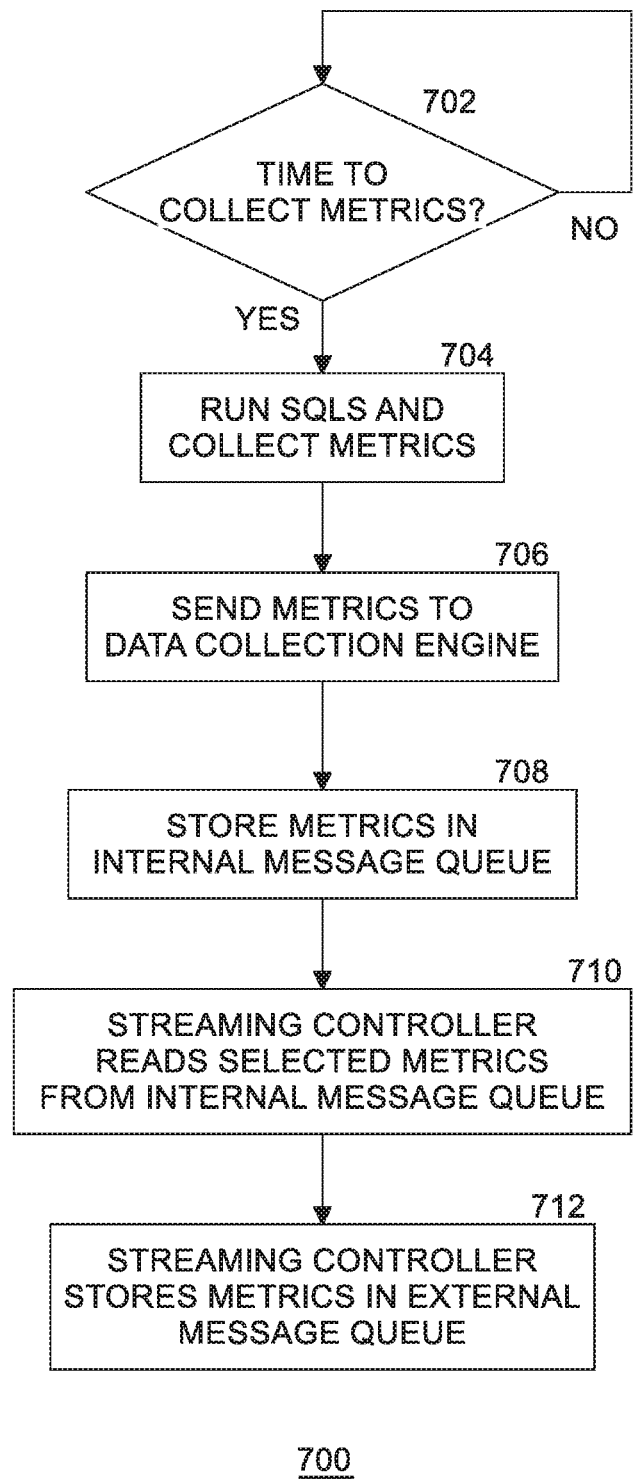
FIG. 7 is a flow diagram of example processing by an application metrics collector according to some embodiments.

FIG. 7 is a flow diagram 700 of example processing of application metrics collection according to some embodiments. In an embodiment, an application metrics collector (such as 504, 510, . . . 516) runs in a process within distributed computing system 402. Periodically, the application metrics collector checks at block 702 to determine if it is time to collect metrics for an application (such as 502, 508, . . . 514) to which the application metrics collector is assigned or embedded. The periodicity of collecting metrics is implementation dependent and may be individually set (or updated) for each application (or type of application). If it is not time to collect metrics, then the application metrics collector waits. If it is time to collect metrics, then at block 704 the application metrics collector runs structured query language (SQL) commands to collect metrics from the application as the application is being executed by the distributed computing system. SQL is a domain-specific language commonly used in programming and designed for managing data held in a relational database management system, or for stream processing in a relational data stream management system.

The application metrics collector collects metrics over a period of time and at block 706 sends the collected metrics to data collection engine 408. At block 708, the data collection engine receives the metrics and stores the metrics in internal message queue 602. At block 710, streaming controller 604 reads selected metrics (based on subscriber needs and use cases) from internal message queue 602 and at block 712 stores the metrics in external message queue 422. In an embodiment, streaming controller 604 reads metrics from internal message queue 422 every minute for metrics that have arrived in the previous five minutes (to catch metrics that arrive late).

Figure 8:
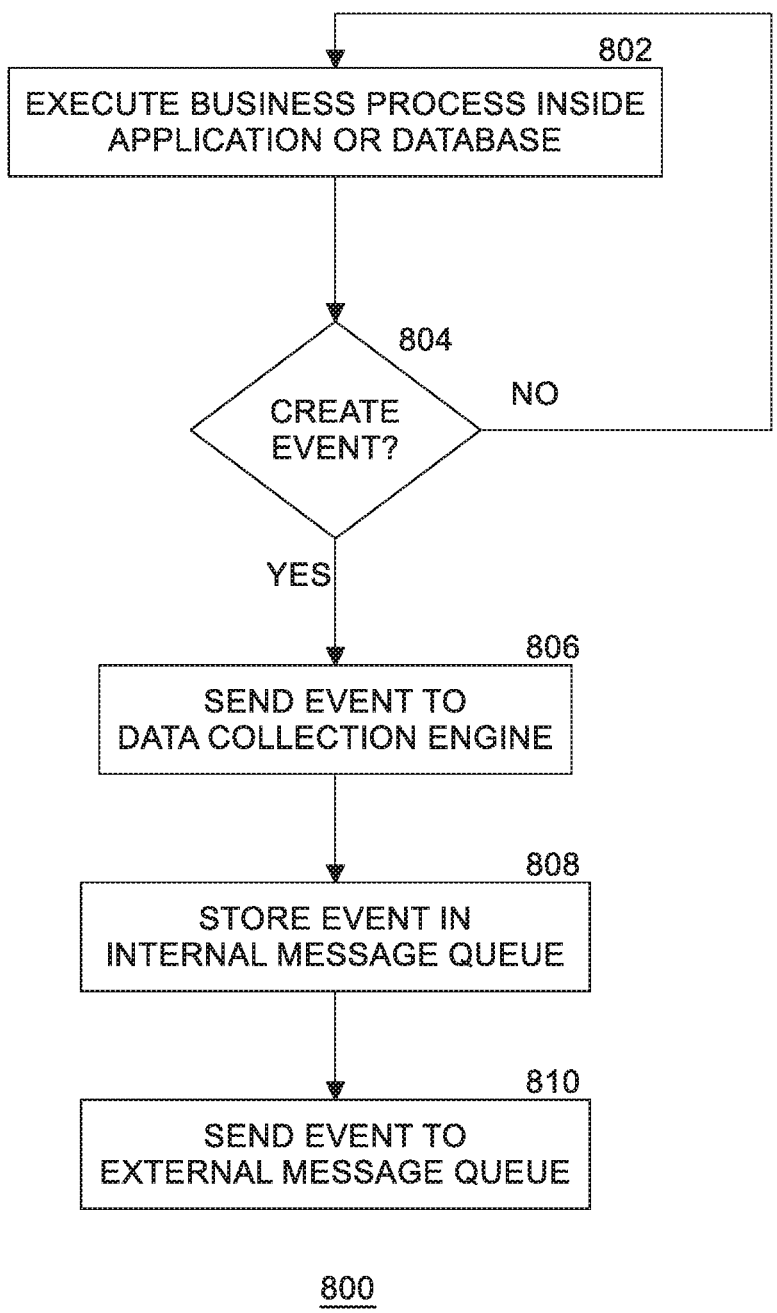
FIG. 8 is a flow diagram of example processing by an event collector according to some embodiments.

FIG. 8 is a flow diagram 800 of example of event collection processing according to some embodiments. At block 802, a business process executes inside of an application 404 or database 410. At block 804, when the process changes state or reaches a defined point, an event is created. If no event is created, processing returns to block 802. When an event is created at block 804, the application events collector 504, 510, . . . 516 (for applications) or DB events collector 520 (for databases) sends the event to data collection engine 408. Data collection engine 408 stores the newly received event into internal message queue 602 at block 808. The business process keeps running. At block 810, streaming controller 604 reads the event from the internal message queue and sends the event to external message queue 422.

Figure 9:
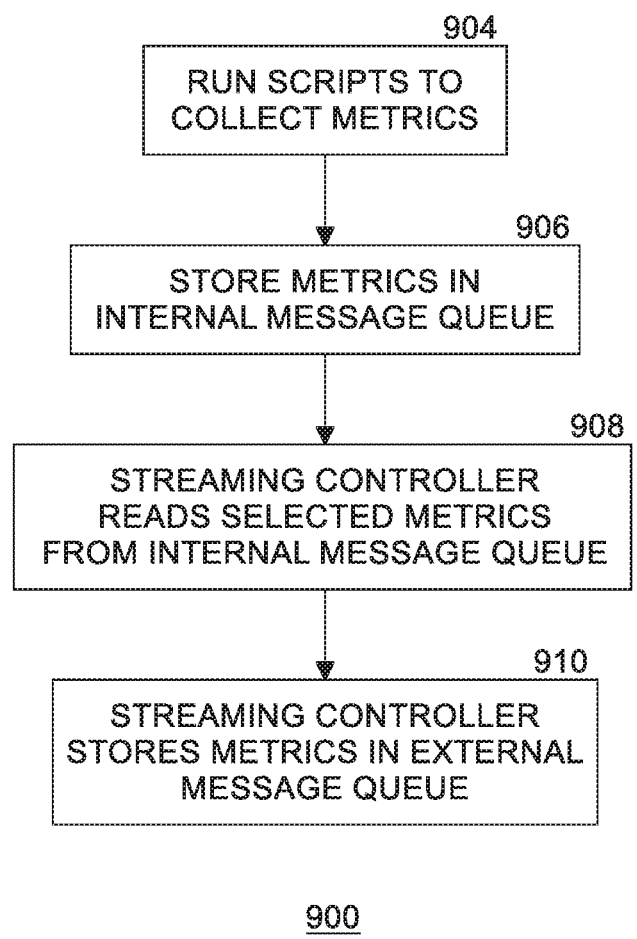
FIG. 9 is a flow diagram of example processing by an operating system (OS) metrics collector according to some embodiments.

FIG. 9 is a flow diagram 900 of example processing by OS metrics collector 528 according to some embodiments. At block 904, OS 414 runs one or more scripts to collect metrics about the operation of the OS. OS metrics collector 528 sends the metrics over communications interface 417 to data collection engine 408. Data collection engine 408 stores the metrics in internal message queue 602. At block 908, streaming controller 604 reads selected metrics from internal message queue 602 and at block 910 streaming controller 604 stores the selected metrics in external message queue 422.

Figure 10:
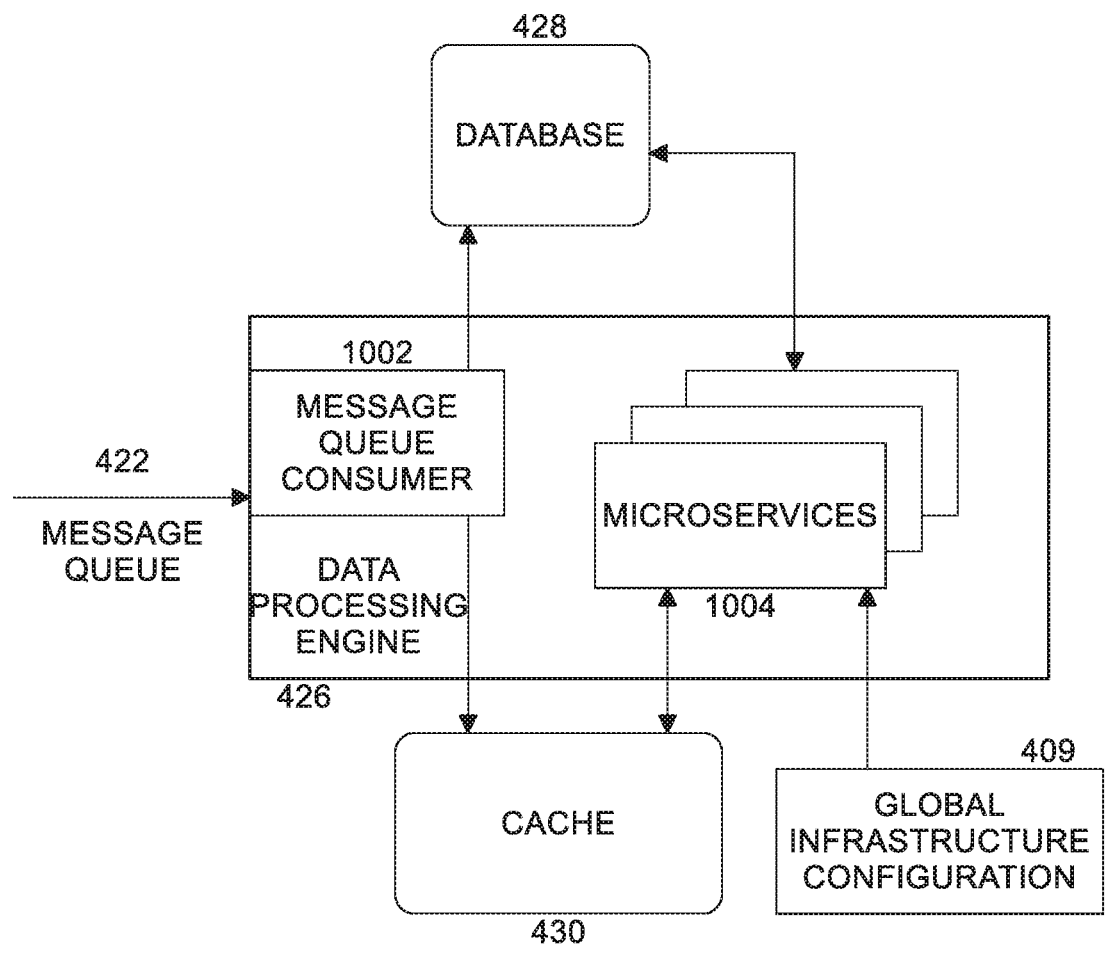
FIG. 10 illustrates an example of a data processing engine according to some embodiments.

FIG. 10 illustrates an example 1000 of data processing engine 426 according to some embodiments. Data processing engine 426 includes message queue consumer 1002 and a plurality of programmable microservices 1004. Message queue consumer 1002 reads messages (containing one or more of events, metrics, and/or global infrastructure configuration items) from message queue 422 and stores the events and/or metrics in database 428 and/or cache 430. In one embodiment, metrics (including key and value pairs) are stored in cache 430, and events (which often have additional contextual information associated with them, such as, for example, in elastic search microservices) are stored in database 428. In one embodiment, message queue consumer 1002 is an Apache Kafka® consumer. Microservices 1004 read configuration data from global infrastructure configuration 409 as needed. Microservices 1004 perform data cleanup and data transformation operations on the incoming events, metrics and/or global infrastructure configuration items based at least in part on subscriber use cases.

Figure 11:
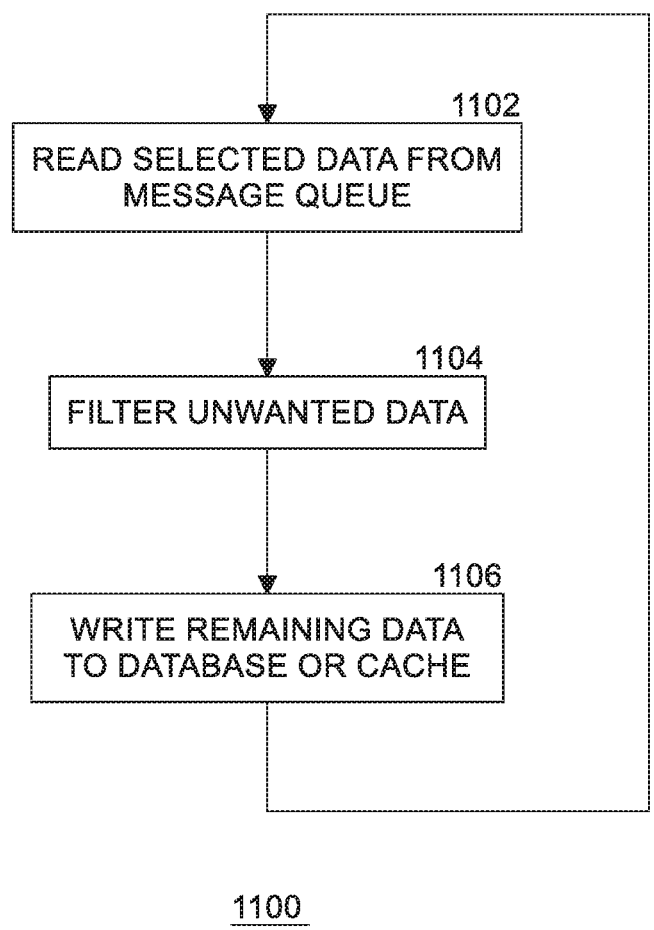
FIG. 11 is a flow diagram of example processing by a message queue consumer according to some embodiments.

FIG. 11 is a flow diagram 1100 of example processing by message queue consumer 1002 according to some embodiments. At block 1102, message queue consumer 1002 reads selected data from message queue 422. In an embodiment, data is selected according to a selected Apache Kafka® topic, which are configured for production/consumption use depending on the use case set up by a subscriber. At block 1104, message queue consumer 1002 filters out unwanted data. At block 1106, message queue consumer 1002 writes the remaining data (after filtering) into database 428 and/or cache 430. Message queue consumer processing continues with further reads at block 1102.

Figure 12:
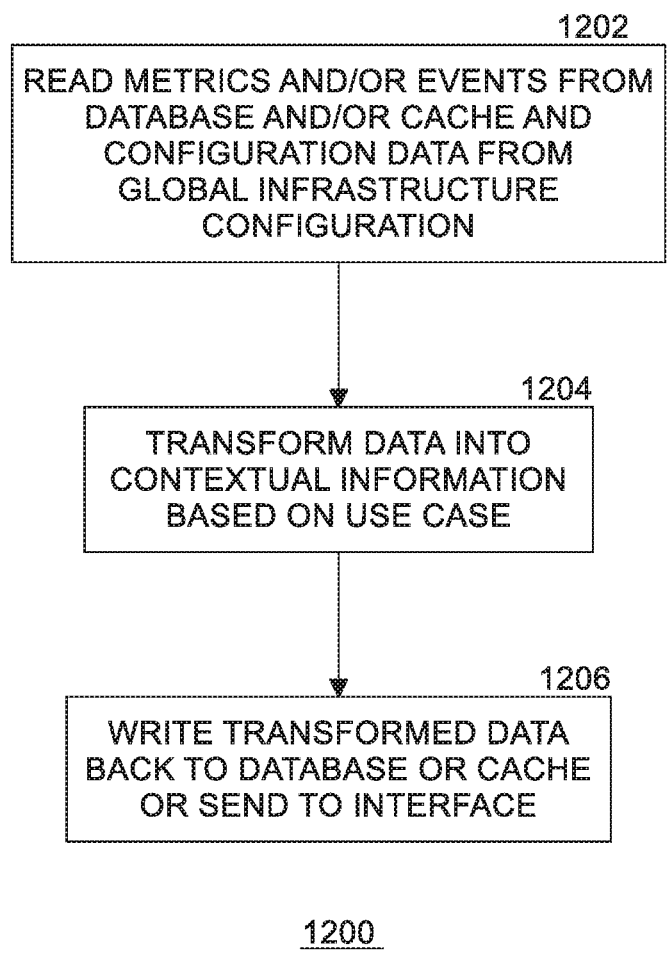
FIG. 12 is a flow diagram of example processing by a microservice according to some embodiments.

FIG. 12 is a flow diagram 1200 of example processing by a microservice 1004 according to some embodiments. Microservices 1004 may be designed and coded to handle specific subscriber use cases to process one or more of events, metrics, and global infrastructure configuration items in certain ways. At block 1202, a microservice reads one or more of metrics and/or events from database 428 and/or cache 430, and configuration data from global infrastructure configuration 409. At block 1204, the microservice transforms the data into contextual information based on a subscriber use case. At block 1206, microservice 1004 writes transformed data back to database 428 and/or cache 430, and/or sends the data to user interface 434.

Generally, a microservice aggregates and interprets discrete events and metrics to derive higher level business process state information in order to determine required control actions in response (e.g., feedback). In an embodiment, a microservice includes custom logic for transformations of data depending on a subscriber use case. An example use case is for patching of a database. Events may be sent by a database 410 describing the patching process on each instance of database. The patching process can be monitored by a microservice over a period of time (e.g., five minutes) and contextual processing engine 424 can update the real time state of the patching process on a per instance level on a dashboard using user interface 434. In another example use case, events or metrics may be filtered out of decommissioned instances of an application. A microservice may validate that the events or metrics are coming from valid production hosts (e.g., properly functioning servers in distributed computing system 402). In another example use case, if a certain expected event does not occur for a predetermined period of time, a microservice can generate a new event to indicate this situation for further usage in user interface 434 and/or feedback engine 432. In another example use case, a microservice combines performance metrics from every instance of a server to generate an aggregated metric for the server as a whole. Many other use cases are contemplated. Embodiments of the present invention provide the flexibility for writing any transformation logic to be applied by a microservice to incoming heterogeneous data (e.g., events, metrics, configuration updates, etc.)

Figure 13:
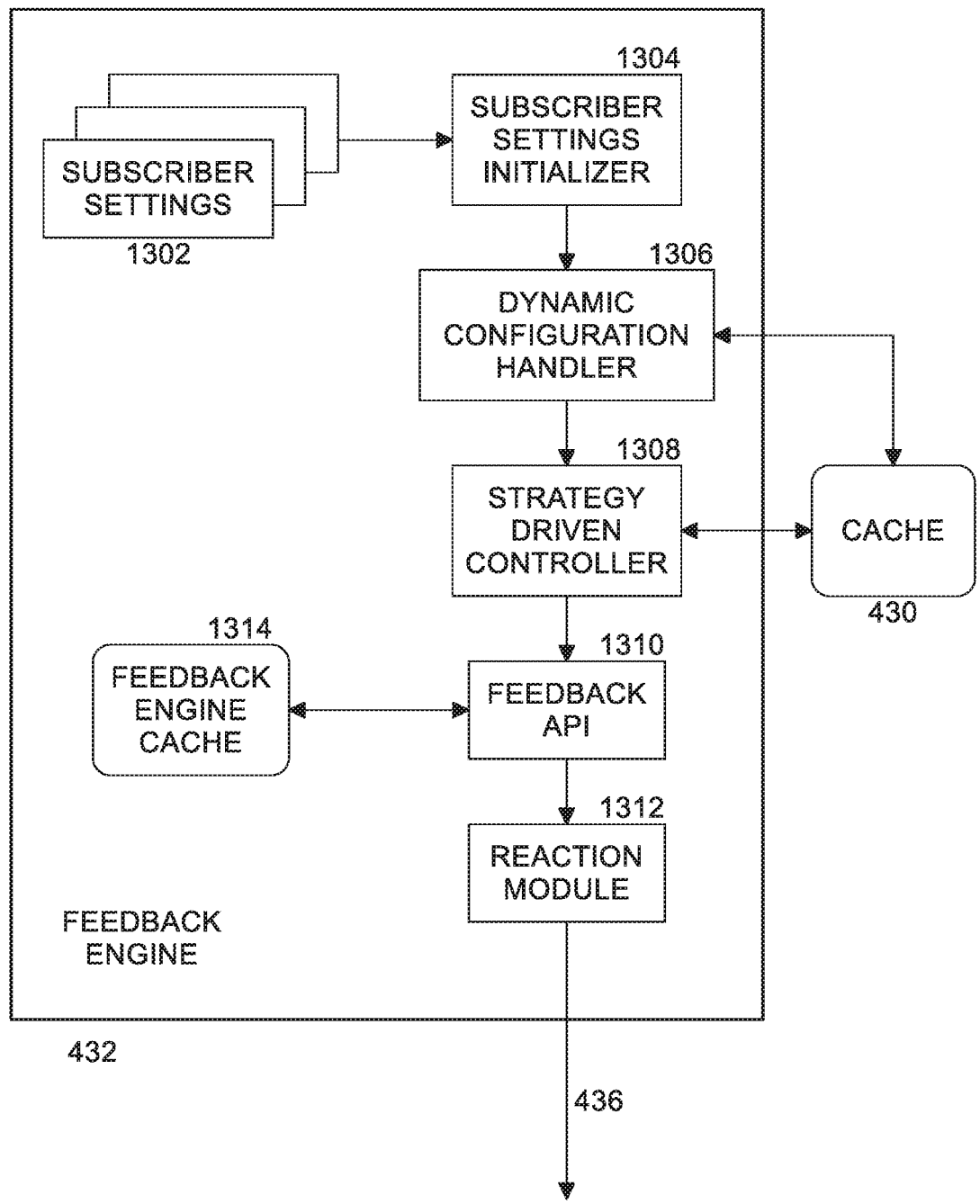
FIG. 13 illustrates an example of a feedback engine according to some embodiments.

FIG. 13 illustrates an example 1300 of feedback engine 432 according to some embodiments. Feedback engine 432 includes a plurality of subscriber settings 1302. Each subscriber has an associated set of one or more settings that define what events and/or metrics to monitor and what feedback to give. In one embodiment, a subscriber setting includes an identifier of a subscriber, a feedback type (such as critical/back off, warning, high, normal, least utilization, none, off, and so on), a feedback strategy (such as threshold-based, when a threshold is reached a predetermined feedback is sent, configuration information for the feedback strategy (such as settings for cache 430), and a reaction type (such as email (with parameters), text message, or an external endpoint to make a function callback (which may or may not be within an application)). Subscriber settings are initialized by subscriber settings initializer 1304. In an embodiment, subscriber settings are received from subscribers.

Once subscriber settings have been initialized, on receipt of a subscriber request for a reaction (e.g., feedback), dynamic configuration handler 1306 updates in-memory dynamic configuration information based on static settings and real time metrics, events, and configurations. The dynamic configuration handler searches cache 430 for feedback to return based at least in part on the subscriber settings. Strategy driven controller 1308 uses the dynamic configuration information, metrics, events, and global infrastructure configuration information to compute the feedback. Feedback API 1310 stores the feedback in feedback cache 1314 and forwards the feedback to reaction module 1312. Reaction module 1312 delivers the feedback, for example by sending an email, raising a custom alert, or calling the subscriber at a selected reaction function based at least in part on the subscriber settings and the computed feedback. In some embodiments, the reaction module may be modified (e.g., by system administrators or cloud computing environment engineers) to provide flexibility in what types of feedback are given.

Figure 14:
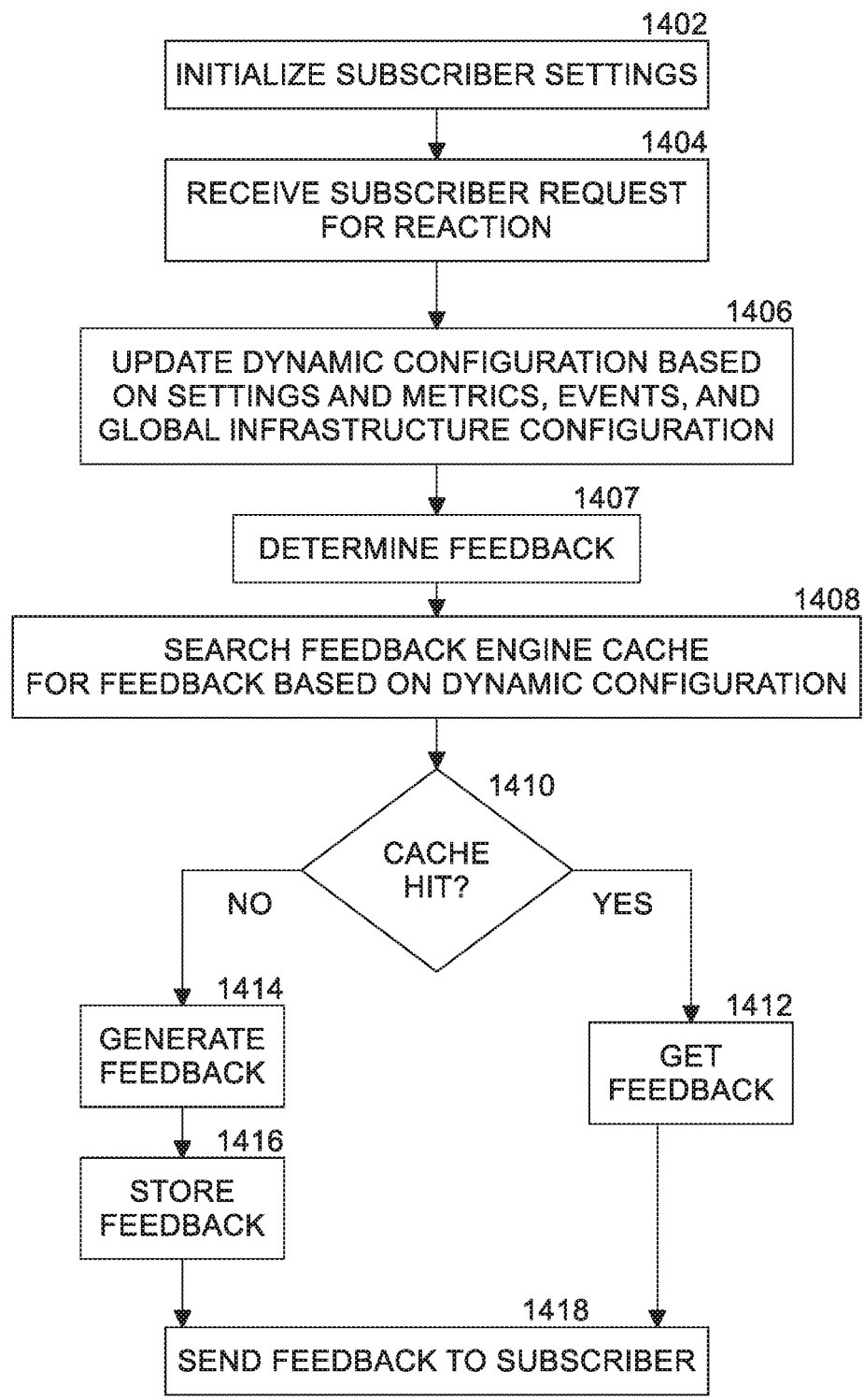
FIG. 14 is a flow diagram of example processing by the feedback engine according to some embodiments.

FIG. 14 is a flow diagram 1400 of example processing by feedback engine 432 according to some embodiments. At block 1402, subscriber settings initializer 1304 initializes the settings for each subscriber. Once initialized, at block 1404 feedback engine receives one or more subscriber requests for reaction (e.g., for dynamic feedback). At block 1406, dynamic configuration handler 1306 updates an in-memory dynamic configuration based on the subscriber settings and metrics, events, and global infrastructure configuration information. Strategy driven controller determines the feedback at block 1407 based at least in part on the in-memory dynamic configuration. At block 1408, strategy driven controller 1308 uses feedback API 1310 to search feedback engine cache 1314 for the feedback based at least in part on the in-memory dynamic configuration. If there is a cache hit at block 1410 (e.g., the determined feedback is already in the feedback engine cache) then strategy driven controller 1308 gets the feedback from the feedback engine cache via a feedback API 1310. Otherwise, there is no cache hit at block 1410 (the determined feedback has not previously been determined and stored in the feedback engine cache), and strategy driven controller 1308 generates feedback at block 1414. In an embodiment, the newly generated feedback is stored in the feedback engine cache 1314 for future use at block 1416. In either case, reaction module 1312 sends the feedback to the appropriate subscriber at block 1418.

Figure 15:
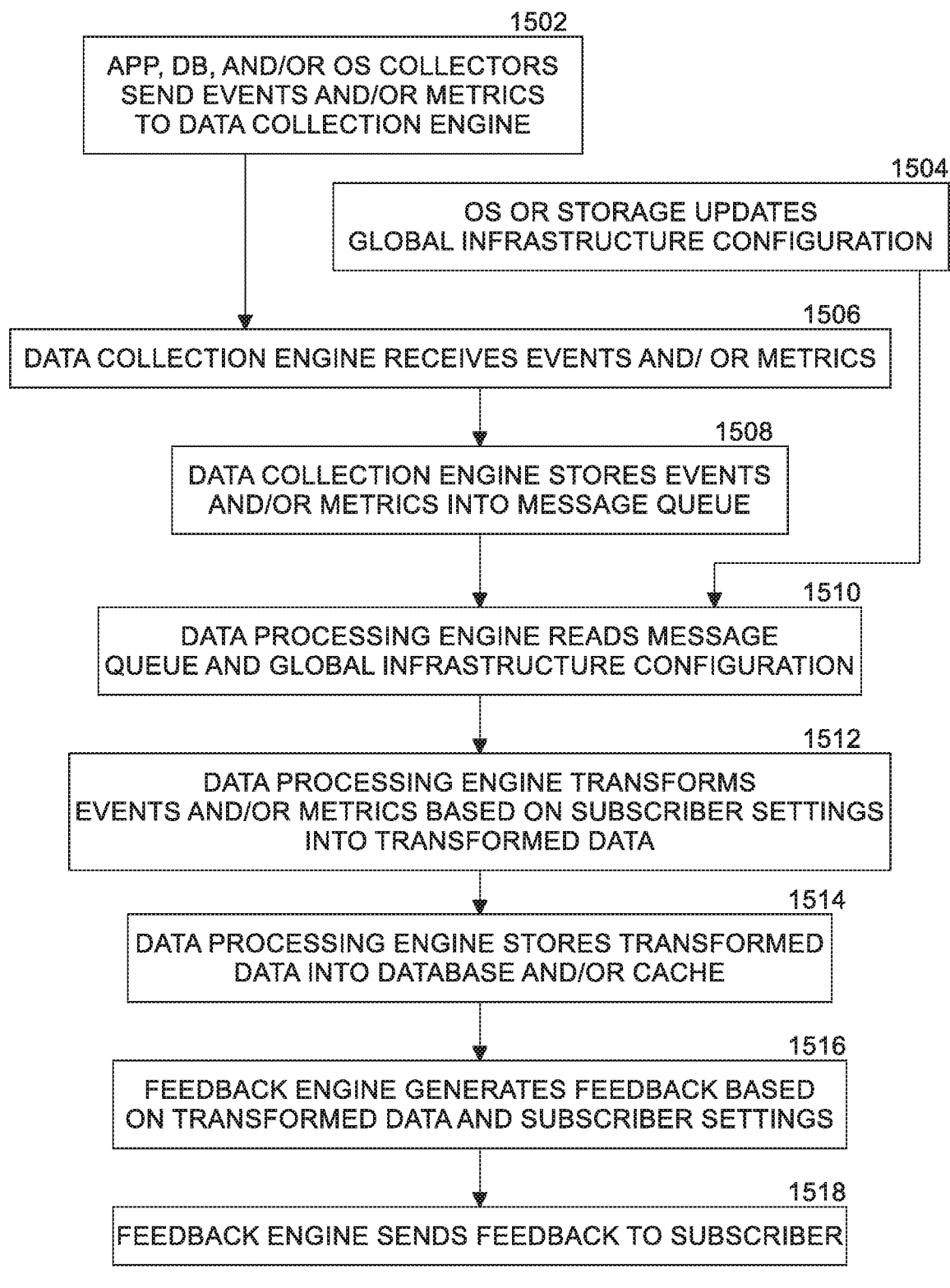
FIG. 15 is a flow diagram of example monitoring system processing according to some embodiments.

FIG. 15 is a flow diagram 1500 of example monitoring system 400 processing according to some embodiments. At block 1502, application (app), database (DB), and/or OS events/metrics collectors (such as app events/metrics collector 1 504, app events/metrics collector 2 510, app events/metrics collector N 516, DB events collector 520, and OS metrics collector 528) send events and/or metrics as data items to data collection engine 408. At block 1506, data collection engine receives the events and/or metrics. At block 1508, data collection engine 408 stores selected data items of the events and/or metrics into message queue 422. At block 1504, independent of actions by the collectors, OS 414 and/or storage 418 may update global infrastructure configuration 409. At block 1510, data processing engine 426 reads messages from message queue 422 (e.g., the events and/or metrics) and global infrastructure configuration 409. At block 1512, data processing engine 426 transforms the events and/or metrics read from the message queue based at least in part on subscriber settings into transformed data items. At block 1514, data processing engine 426 stores the transformed data items into database 428 and/or cache 430. Optionally, data processing engine 426 may forward the transformed data items from database 428 and/or cache 430 to user interface 434 to display at least a portion of the transformed data items based at least in part on the subscriber settings. At block 1516, feedback engine 432 generates feedback based at least in part on the transformed data items and the subscriber settings. At block 1518, feedback engine 432 (using reaction module 1312) sends the feedback to the subscriber. The subscriber (e.g., one of the applications, databases, or OS) can then automatically perform a remediation action in response to receiving the feedback.

In embodiments of the present invention, different types of contextual information such as events, metrics, and configuration information are collected. The data are collected from individual processes, user-triggered actions, and automations in database, hardware and application layers. Contextual feedback is generated, taking into account data of different types and sources (e.g., events, metrics, configuration information, and so on). A customizable data collection and feedback system as described herein allows multiple subscribers to select or create feedback settings and receive a customizable reaction. Different subscribers can re-use the subscriber settings or create new ones.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which a computing environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™ (a trademark of Sun Microsystems, Inc.), or Perl using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A monitoring system, comprising: a data collection engine to receive data items comprising events, metrics, or one or more configurations about a distributed computing system being monitored, and to store selected data items into a message queue; a data processing engine to receive the selected data items from the message queue, transform the selected data items into transformed data items based at least in part on one or more settings for a subscriber and the one or more configurations of the distributed computing system, and store the transformed data items into one or more of a database and a cache; and a feedback engine to read the transformed data items from the one or more of the database and the cache, generate feedback for the subscriber based at least in part on the transformed data items and the one or more settings for the subscriber and the configurations, and send the feedback to the subscriber; wherein the subscriber is an application program, a database, or an operating system of the distributed computing system; wherein the one or more configurations comprise information which defines behaviors and/or capabilities of the distributed computing system; and wherein sending the feedback to the subscriber causes the subscriber to automatically perform remediation operations for the distributed computing system in response to receiving the feedback.

2. The monitoring system of claim 1, the subscriber comprising a data collector to collect one or more of events and metrics and send the one or more of events and metrics to the data collection engine.

3. The monitoring system of claim 1, wherein the feedback comprises a function callback to the subscriber.

4. The monitoring system of claim 1, the data collection engine to filter received events and metrics based at least in part on the one or more subscriber settings.

5. The monitoring system of claim 1, the data processing engine comprising a plurality of microservices to transform the selected data items into transformed data items, wherein each microservice comprises custom logic to aggregate and interpret events and metrics to derive business process state information supporting generation of feedback.

6. The monitoring system of claim 1, the feedback engine comprising the subscriber settings, the subscriber settings comprising one or more of a subscriber identifier, a feedback type, a feedback strategy, and a reaction type.

7. The monitoring system of claim 1, the feedback engine comprising a feedback engine cache to store the feedback.

8. A computer-implemented method comprising: receiving, by a data collection engine, data items comprising events, metrics, or one or more configurations about a distributed computing system being monitored, and storing selected data items into a message queue; receiving, by a data processing engine, the selected data items from the message queue, transforming the selected data items into transformed data items based at least in part on one or more settings for a subscriber and the one or more configurations of the distributed computing system, and storing the transformed data items into one or more of a database and a cache; and reading, by a feedback engine, the transformed data items from the one or more of the database and the cache, generating feedback for the subscriber based at least in part on the transformed data items and the one or more settings for the subscriber and the configurations and sending the feedback to the subscriber; wherein the subscriber is an application program, a database, or an operating system of the distributed computing system; wherein the one or more configurations comprise information which defines behaviors and/or capabilities of the distributed computing system; and wherein sending the feedback to the subscriber causes the subscriber to automatically perform remediation operations for the distributed computing system in response to receiving the feedback.

9. The computer-implemented method of claim 8, comprising collecting one or more of events and metrics by a data collector in the subscriber and sending the one or more of events and metrics to the data collection engine.

10. The computer-implemented method of claim 8, wherein the feedback comprises a function callback to the subscriber.

11. The computer-implemented method of claim 8, comprising filtering, by the data collection engine, received events and metrics based at least in part on the one or more subscriber settings.

12. The computer-implemented method of claim 8, comprising executing, by the data processing engine, a plurality of microservices to transform the selected data items into transformed data items, wherein each microservice comprises custom logic for aggregating and interpreting events and metrics to derive business process state information supporting generation of feedback.

13. A tangible, non-transitory computer-readable storage medium having instructions encoded thereon which, when executed by a processing device, cause the processing device to: receive, by a data collection engine, data items comprising events, metrics, or one or more configurations about a distributed computing system being monitored, and store selected data items into a message queue; receive, by a data processing engine, the selected data items from the message queue, transform the selected data items into transformed data items based at least in part on one or more settings for a subscriber and the one or more configurations of the distributed computing system, and store the transformed data items into one or more of a database and a cache; and read, by a feedback engine, the transformed data items from the one or more of the database and the cache, generate feedback for the subscriber based at least in part on the transformed data items and the one or more settings for the subscriber and the configurations and send the feedback to the subscriber; wherein the subscriber is an application program, a database, or an operating system of the distributed computing system; wherein the one or more configurations comprise information which defines behaviors and/or capabilities of the distributed computing system; and wherein instructions to send the feedback to the subscriber cause the subscriber to automatically perform remediation operations for the distributed computing system in response to receiving the feedback.

14. The tangible, non-transitory computer-readable storage medium of claim 13, comprising instructions to collect one or more of events and metrics by a data collector in the subscriber and send the one or more of events and metrics to the data collection engine.

15. The tangible, non-transitory computer-readable storage medium of claim 13, wherein the feedback comprises a function callback to the subscriber.

16. The tangible, non-transitory computer-readable storage medium of claim 13, comprising instructions to filter, by the data collection engine, received events and metrics based at least in part on the one or more subscriber settings.

17. The tangible, non-transitory computer-readable storage medium of claim 13, comprising instructions to execute by the data processing engine, a plurality of microservices to transform the selected data items into transformed data items, wherein each microservice comprises custom logic for aggregating and interpreting events and metrics to derive business process state information supporting generation of feedback.

* * * * *